US012715238B2

(12) United States Patent
Christensen et al.

(10) Patent No.: US 12,715,238 B2
(45) Date of Patent: Aug. 25, 2026

(54) PAINT CONTAINER LINER

(71) Applicants: Kenneth Christensen, Bend, OR (US); Jonathan Beard, Bend, OR (US)

(72) Inventors: Kenneth Christensen, Bend, OR (US); Jonathan Beard, Bend, OR (US)

( * ) Notice: Subject to any disclaimer, the term of this patent is extended or adjusted under 35 U.S.C. 154(b) by 440 days.

(21) Appl. No.: 17/729,417

(22) Filed: Apr. 26, 2022

(65) Prior Publication Data

US 2023/0339259 A1 Oct. 26, 2023

(51) Int. Cl.
*B44D 3/12* (2006.01)
*B65D 25/16* (2006.01)

(52) U.S. Cl.
CPC .............. *B44D 3/128* (2013.01); *B65D 25/16* (2013.01)

(58) Field of Classification Search
CPC ............. B05C 17/0245; Y10S 220/904; Y10T 24/3427; Y10T 24/3457; D06F 1/02; A47J 47/18; A47L 13/51; B44D 2/00; B44D 2/002; B44D 3/00; B44D 3/003; B44D 3/006; B44D 3/02; B44D 3/04; B44D 3/06; B44D 3/08; B44D 3/105; B44D 3/12; B44D 3/121; B44D 3/122; B44D 3/123; B44D 3/125; B44D 3/126; B44D 3/127; B44D 3/128; B44D 3/14; B44D 3/16; B44D 3/164; B44D 3/22; B44D 3/225; B44D 3/24; B44D 5/00; B65D 1/00; B65D 1/02; B65D 1/0207; B65D 1/0215; B65D 1/0223; B65D 1/023; B65D 1/0238; B65D 1/0246; B65D 1/0261; B65D 1/0292; B65D 1/04; B65D 1/06; B65D 1/09; B65D 1/10; B65D 1/12; B65D 1/14; B65D 1/16; B65D 1/165; B65D 1/18; B65D 1/20; B65D 1/22; B65D 1/24; B65D 1/26; B65D 1/265; B65D 1/28; B65D 1/32; B65D 1/323; B65D 1/34; B65D 1/36; B65D 1/40; B65D 1/42; B65D 1/44; B65D 1/46; B65D 11/00; B65D 11/02; B65D 11/04; B65D 11/06; B65D 11/08; B65D 11/10; B65D 11/16; B65D 11/18; B65D 11/1846; B65D 11/1866; B65D 11/26; B65D 13/00; B65D 15/00; B65D 15/02; B65D 15/04; B65D 15/06; B65D 15/08; B65D 15/10; B65D 15/14; B65D 15/18; B65D 15/22; B65D 17/00; B65D 17/02; B65D 17/06; B65D 17/08; B65D 17/10; B65D 17/12; B65D 17/28;
(Continued)

(56) References Cited

U.S. PATENT DOCUMENTS 2,117,404 A * 5/1938 Curtis ..................... A47J 47/18 15/264
2,565,448 A * 8/1951 Brownell ................ A47J 47/18 294/170
(Continued)

FOREIGN PATENT DOCUMENTS

AU 2016208442 A1 * 2/2018 ............. B65D 25/04
CN 211140002 U * 7/2020 ............... B65D 6/10

*Primary Examiner* — Anthony D Stashick
*Assistant Examiner* — Marcos Javier Rodriguez Molina

(57) ABSTRACT

A liner having two cavities to hold paint is configured for positioning within an interior cavity of a container to an engaged position therein. While in the engaged position, the liner opening is held centered or coaxial to the opening of the container whereby the user can rotate the liner to reposition the two cavities for easier access thereto.

6 Claims, 5 Drawing Sheets

(58) Field of Classification Search
CPC .. B65D 17/34; B65D 17/401; B65D 17/4011; B65D 17/4012; B65D 17/404; B65D 17/42; B65D 17/462; B65D 17/50; B65D 17/502; B65D 17/506; B65D 19/00; B65D 19/0002; B65D 19/0012; B65D 19/0028; B65D 19/04; B65D 19/06; B65D 19/08; B65D 19/10; B65D 19/12; B65D 19/16; B65D 19/18; B65D 19/20; B65D 19/38; B65D 19/385; B65D 19/44; B65D 21/00; B65D 21/02; B65D 21/0201; B65D 21/0202; B65D 21/0204; B65D 21/0205; B65D 21/0209; B65D 21/0212; B65D 21/0213; B65D 21/0217; B65D 21/0219; B65D 21/022; B65D 21/0222; B65D 21/0223; B65D 21/0224; B65D 21/0228; B65D 21/023; B65D 21/0231; B65D 21/0233; B65D 21/0235; B65D 21/032; B65D 21/04; B65D 21/046; B65D 21/048; B65D 21/06; B65D 21/062; B65D 21/08; B65D 21/086; B65D 2201/00; B65D 2203/00; B65D 2203/02; B65D 2203/04; B65D 2203/06; B65D 2203/10; B65D 2203/12; B65D 2205/00; B65D 2205/02; B65D 2205/025; B65D 2205/04; B65D 2207/00; B65D 2209/00; B65D 2213/00; B65D 2213/02; B65D 2215/04; B65D 2215/06; B65D 2221/00; B65D 2231/001; B65D 2231/002; B65D 2231/004; B65D 2231/005; B65D 2231/007; B65D 2231/008; B65D 2231/02; B65D 2231/022; B65D 2251/0015; B65D 2251/0018; B65D 2251/0025; B65D 2251/0028; B65D 2251/0031; B65D 2251/0062; B65D 2251/0071; B65D 2251/0075; B65D 2251/0078; B65D 2251/0081; B65D 2251/0087; B65D 2251/0093; B65D 2251/01; B65D 2251/02; B65D 2251/023; B65D 2251/026; B65D 2251/04; B65D 2251/08; B65D 2251/10; B65D 2251/1008; B65D 2251/105; B65D 2251/1058; B65D 2251/20; B65D 2251/205; B65D 23/00; B65D 23/001; B65D 23/003; B65D 23/02; B65D 23/04; B65D 23/06; B65D 23/065; B65D 23/08; B65D 23/0807; B65D 23/0814; B65D 23/0821; B65D 23/0864; B65D 23/10; B65D 23/102; B65D 23/104; B65D 23/108; B65D 23/12; B65D 23/14; B65D 23/16; B65D 2301/20; B65D 2313/00; B65D 2313/02; B65D 2313/04; B65D 2313/08; B65D 2401/00; B65D 2401/10; B65D 2401/15; B65D 2401/20; B65D 2401/25; B65D 2401/30; B65D 2401/35; B65D 2401/55; B65D 2401/60; B65D 25/00; B65D 25/02; B65D 25/04; B65D 25/06; B65D 25/08; B65D 25/10; B65D 25/108; B65D 25/14; B65D 25/16; B65D 25/18; B65D 25/20; B65D 25/205; B65D 25/22; B65D 25/24; B65D 25/28; B65D 25/2802; B65D 25/2805; B65D 25/2808; B65D 25/2811; B65D 25/2817; B65D 25/282; B65D 25/2823; B65D 25/2826; B65D 25/2829; B65D 25/2832; B65D 25/2835; B65D 25/2841; B65D 25/285; B65D 25/2852; B65D 25/2855; B65D 25/2858; B65D 25/2864; B65D 25/2867; B65D 25/287; B65D 25/2873; B65D 25/2876; B65D 25/2879; B65D 25/2882; B65D 25/2885; B65D 25/2888; B65D 25/2897; B65D 25/30; B65D 25/32; B65D 25/325; B65D 25/34; B65D 25/36; B65D 25/38; B65D 25/40; B65D 25/42; B65D 25/44; B65D 25/465; B65D 25/48; B65D 25/50; B65D 25/52; B65D 25/54; B65D 25/56; B65D 2501/0018; B65D 2501/0027; B65D 2501/0036; B65D 2501/0081; B65D 2517/0007; B65D 2517/0011; B65D 2517/0013; B65D 2517/0014; B65D 2517/004; B65D 2517/0041; B65D 2517/0053; B65D 2517/0056; B65D 2517/0061; B65D 2517/0076; B65D 2517/0079; B65D 2517/0082; B65D 2517/0083; B65D 2517/0088; B65D 2517/5054; B65D 2517/5056; B65D 2517/5083; B65D 2517/5091; B65D 2519/00019; B65D 2519/00024; B65D 2519/00029; B65D 2519/00034; B65D 2519/00044; B65D 2519/00054; B65D 2519/00059; B65D 2519/00064; B65D 2519/00069; B65D 2519/00079; B65D 2519/00099; B65D 2519/00129; B65D 2519/00134; B65D 2519/00139; B65D 2519/00159; B65D 2519/00164; B65D 2519/00169; B65D 2519/00174; B65D 2519/00184; B65D 2519/00194; B65D 2519/00199; B65D 2519/00203; B65D 2519/00208; B65D 2519/00213; B65D 2519/00218; B65D 2519/00233; B65D 2519/00268; B65D 2519/00273; B65D 2519/00278; B65D 2519/00288; B65D 2519/00293; B65D 2519/00298; B65D 2519/00318; B65D 2519/00323; B65D 2519/00333; B65D 2519/00338; B65D 2519/00363; B65D 2519/00373; B65D 2519/00398; B65D 2519/00407; B65D 2519/00412; B65D 2519/00422; B65D 2519/00427; B65D 2519/00452; B65D 2519/00497; B65D 2519/00502; B65D 2519/00507; B65D 2519/00512; B65D 2519/00532; B65D 2519/00557; B65D 2519/00562; B65D 2519/00567; B65D 2519/00572; B65D 2519/00582; B65D 2519/00587; B65D 2519/00592; B65D 2519/00597; B65D 2519/00601; B65D 2519/00616; B65D 2519/00621; B65D 2519/00631; B65D 2519/00641; B65D 2519/00661; B65D 2519/00666; B65D 2519/00701; B65D 2519/00711; B65D 2519/00746; B65D 2519/00756; B65D 2519/00761; B65D 2519/00781; B65D 2519/008; B65D 2519/00805; B65D 2519/0081; B65D 2519/00815; B65D 2519/0082; B65D 2519/00855; B65D 2519/0086; B65D 2519/0087; B65D 2519/0091; B65D 2519/00915; B65D 2519/00925; B65D 2519/0094; B65D 2519/00955; B65D 2519/0096; B65D 2519/00965; B65D 2519/00975; B65D 2519/0098; B65D 2519/00985; B65D 2525/281; B65D 2525/284; B65D 2525/285; B65D 2525/288; B65D 2525/289; B65D 2539/008; B65D 2543/00027; B65D 2543/00037; B65D 2543/00046; B65D 2543/00074; B65D 2543/00083; B65D 2543/00092; B65D 2543/00101; B65D 2543/0012; B65D 2543/00148; B65D 2543/00175; B65D 2543/00194; B65D 2543/00203; B65D 2543/00222; B65D 2543/00231; B65D 2543/0024; B65D 2543/0025; B65D 2543/00268; B65D 2543/00277; B65D 2543/00296; B65D 2543/00305; B65D 2543/00314; B65D 2543/00324; B65D 2543/00351; B65D 2543/00361; B65D 2543/0037; B65D 2543/00379; B65D 2543/00388; B65D 2543/00398; B65D 2543/00407; B65D 2543/00416; B65D 2543/00425; B65D 2543/00435; B65D 2543/00453; B65D 2543/00462; B65D 2543/00472; B65D 2543/0049; B65D 2543/005; B65D 2543/00509; B65D 2543/00518; B65D 2543/00527; B65D 2543/00537; B65D 2543/00546; B65D 2543/00555; B65D 2543/00564; B65D 2543/00574; B65D 2543/00583; B65D 2543/00611; B65D 2543/0062; B65D 2543/00629; B65D 2543/00638; B65D 2543/00648; B65D 2543/00657; B65D 2543/00666; B65D 2543/00685; B65D 2543/00694; B65D 2543/00703; B65D 2543/00731; B65D 2543/0074; B65D 2543/0075; B65D 2543/00759; B65D 2543/00768; B65D 2543/00796; B65D 2543/00805; B65D 2543/00814; B65D 2543/00824; B65D 2543/00833; B65D 2543/00842; B65D 2543/00851; B65D 2543/0087; B65D 2543/00879; B65D 2543/00888; B65D 2543/00898; B65D 2543/00925; B65D 2543/00935; B65D 2543/00944; B65D 2543/00953; B65D 2543/00962; B65D 2543/00972; B65D 2543/0099; B65D 2547/066; B65D 2555/00; B65D 2555/025; B65D 2565/381; B65D 2565/385; B65D 2565/387; B65D 2571/00037; B65D 2571/00055; B65D 2571/00061; B65D 2571/00086; B65D 2571/00111; B65D 2571/00265; B65D 2571/00308; B65D 2571/00339; B65D 2571/0066; B65D 2571/00716; B65D 2571/00722; B65D 2571/0079; B65D 2571/00796; B65D 2571/00987; B65D 2575/365; B65D 2575/366; B65D 2575/368; B65D 2575/565; B65D 2575/583; B65D 2575/586; B65D 2577/041; B65D 2577/042; B65D 2577/043; B65D 2577/047; B65D 2577/2025; B65D 2577/205; B65D 2577/2066; B65D 2577/2083; B65D 2577/2091; B65D 2581/3406; B65D 2581/3412; B65D 2581/3416; B65D 2581/3437; B65D 2581/3447; B65D 2581/3448; B65D 2581/3464; B65D 2581/3472; B65D 2581/3477; B65D 2581/3478; B65D 2581/3479; B65D 2581/3481; B65D 2581/3482; B65D 2581/3489; B65D 2581/3494; B65D 2583/005; B65D 2583/085; B65D 2585/6865; B65D 2585/6867; B65D 2585/6872; B65D 2585/6882; B65D 2585/6887; B65D 2585/88; B65D 2588/12; B65D 2588/125; B65D 2588/165; B65D 2590/0058; B65D 2590/0066; B65D 2590/0091; B65D 2590/023; B65D 2590/046; B65D 27/00; B65D 3/00; B65D 3/02; B65D 3/04; B65D 3/06; B65D 3/10; B65D 3/12; B65D 3/22; B65D 3/268; B65D 3/28; B65D 3/30; B65D 31/00; B65D 31/02; B65D 31/04; B65D 31/10; B65D 31/14; B65D 31/147; B65D 31/16; B65D 31/18; B65D 33/00; B65D 33/004; B65D 33/008; B65D 33/01; B65D 33/02; B65D 33/06; B65D 33/065; B65D 33/08; B65D 33/14; B65D 33/16; B65D 33/165; B65D 33/25; B65D 33/2508; B65D 33/28; B65D 33/30; B65D 35/00; B65D 35/02; B65D 35/04; B65D 35/08; B65D 35/10; B65D 35/12; B65D 35/14; B65D 35/16; B65D 35/22; B65D 35/24; B65D 35/242; B65D 35/245; B65D 35/28; B65D 35/36; B65D 35/42; B65D 35/44; B65D 35/46; B65D 35/56; B65D 37/00; B65D 39/00; B65D 39/0029; B65D 39/0076; B65D 39/04; B65D 39/08; B65D 39/082; B65D 39/084; B65D 39/086; B65D 39/088; B65D 39/12; B65D 39/16; B65D 41/00; B65D 41/005; B65D 41/02; B65D 41/023; B65D 41/04; B65D 41/0407; B65D 41/0414; B65D 41/0421; B65D 41/0435; B65D 41/0442; B65D 41/045; B65D 41/0464; B65D 41/0471; B65D 41/0478; B65D 41/0485; B65D 41/0492; B65D 41/06; B65D 41/083; B65D 41/086; B65D 41/12; B65D 41/16; B65D 41/17; B65D 41/20; B65D 41/22; B65D 41/26; B65D 41/28; B65D 41/32; B65D 41/325; B65D 41/34; B65D 41/3404; B65D 41/3423; B65D 41/3428; B65D 41/3438; B65D 41/3447; B65D 41/348; B65D 41/42; B65D 41/425; B65D 41/44; B65D 41/445; B65D 41/46; B65D 41/465; B65D 41/48; B65D 41/62; B65D 43/00; B65D 43/02; B65D 43/0202; B65D 43/0204; B65D 43/0206; B65D 43/0208; B65D 43/021; B65D 43/0212; B65D 43/0214; B65D 43/0216; B65D 43/0218; B65D 43/022; B65D 43/0222; B65D 43/0225; B65D 43/0227; B65D 43/0229; B65D 43/0231; B65D 43/0233; B65D 43/0235; B65D 43/0237; B65D 43/0239; B65D 43/0241; B65D 43/0245; B65D 43/0249; B65D 43/0252; B65D 43/0254; B65D 43/0256; B65D 43/0258; B65D 43/026; B65D 43/0281; B65D 43/0295; B65D 43/06; B65D 43/065; B65D 43/08; B65D 43/16; B65D 43/161; B65D 43/162; B65D 43/163; B65D 43/164; B65D 43/18; B65D 43/22; B65D 43/24; B65D 43/26; B65D 43/265; B65D 43/267; B65D 45/02; B65D 45/025; B65D 45/16; B65D 45/18; B65D 45/20; B65D 45/22; B65D 45/28; B65D 45/30; B65D 45/305; B65D 45/32; B65D 45/322; B65D 45/327; B65D 45/34; B65D 45/345; B65D 47/00; B65D 47/04; B65D 47/06; B65D 47/061; B65D 47/063; B65D 47/065; B65D 47/066; B65D 47/0838; B65D 47/0842; B65D 47/0857; B65D 47/088; B65D 47/0895; B65D 47/103; B65D 47/12; B65D 47/121; B65D 47/122; B65D 47/123; B65D 47/14; B65D 47/141; B65D 47/142; B65D 47/18; B65D 47/20; B65D 47/2018; B65D 47/2031; B65D 47/205; B65D 47/2062; B65D 47/2075; B65D 47/2081; B65D 47/242; B65D 47/244; B65D 47/261; B65D 47/263; B65D 47/265; B65D 47/286; B65D 47/30; B65D 47/32; B65D 47/36; B65D 47/40; B65D 47/42; B65D 47/44; B65D 49/00; B65D 49/12; B65D 5/00; B65D 5/008; B65D 5/0227; B65D 5/0236; B65D 5/0245; B65D 5/0254; B65D 5/029; B65D 5/064; B65D 5/067; B65D 5/10; B65D 5/12; B65D 5/16; B65D 5/18; B65D 5/2033; B65D 5/2042; B65D 5/2047; B65D 5/2057; B65D 5/2076; B65D 5/22; B65D 5/241; B65D 5/244; B65D 5/302; B65D 5/3664; B65D 5/38; B65D 5/40; B65D 5/42; B65D 5/4204; B65D 5/4208; B65D 5/4212; B65D 5/4233; B65D 5/4237; B65D 5/4266; B65D 5/4279; B65D 5/4283; B65D 5/445; B65D 5/46008; B65D 5/46024; B65D 5/4608; B65D 5/46096; B65D 5/4612; B65D 5/48014; B65D 5/48022; B65D 5/50; B65D 5/5021; B65D 5/503; B65D 5/5045; B65D 5/5057; B65D 5/5069; B65D 5/54; B65D 5/5405; B65D 5/5415; B65D 5/5445; B65D 5/56; B65D 5/563; B65D 5/566; B65D 5/60; B65D 5/603; B65D 5/62; B65D 5/64; B65D 5/66; B65D 5/6608; B65D 5/665; B65D 5/6661; B65D 5/6664; B65D 5/6685; B65D 5/68; B65D 5/708; B65D 5/72; B65D 5/723; B65D 5/726; B65D 5/727; B65D 5/728; B65D 5/746; B65D 5/748; B65D 50/00; B65D 50/04; B65D 50/045; B65D 50/046; B65D 50/06; B65D 50/067; B65D 50/069; B65D 51/00; B65D 51/002; B65D 51/005; B65D 51/007; B65D 51/14; B65D 51/145; B65D 51/16; B65D 51/1611; B65D 51/1616; B65D 51/1627; B65D 51/1644; B65D 51/1666; B65D 51/1672; B65D 51/1683; B65D 51/1688; B65D 51/18; B65D 51/185; B65D 51/20; B65D 51/222; B65D 51/24; B65D 51/242; B65D 51/243; B65D 51/244; B65D 51/245; B65D 51/246; B65D 51/247; B65D 51/248; B65D 51/249; B65D 51/26; B65D 51/28; B65D 51/2828; B65D 51/2835; B65D 51/2842; B65D 51/2864; B65D 51/32; B65D 53/00; B65D 53/02; B65D 53/04; B65D 53/06; B65D 53/08; B65D 55/00; B65D 55/02; B65D 55/022; B65D 55/024; B65D 55/026; B65D 55/028; B65D 55/06; B65D 55/066; B65D 55/0845; B65D 55/0872; B65D 55/0881; B65D 55/12; B65D 55/14; B65D 55/16; B65D 59/02; B65D 61/00; B65D 63/14; B65D 65/00; B65D 65/10; B65D 65/16; B65D 65/20; B65D 65/38; B65D 65/40; B65D 65/403; B65D 65/406; B65D 65/42; B65D 65/46; B65D 65/463; B65D 65/466; B65D 67/02; B65D 7/02; B65D 7/04; B65D 7/045; B65D 7/06; B65D 7/22; B65D 7/24; B65D 7/26; B65D 7/34; B65D 7/36; B65D 7/38; B65D 7/40; B65D 7/42; B65D 7/46; B65D 7/48; B65D 71/0088; B65D 71/0096; B65D 71/04; B65D 71/06; B65D 71/063; B65D 71/125; B65D 71/16; B65D 71/38; B65D 71/42; B65D 71/50; B65D 71/502; B65D 71/504; B65D 71/508; B65D 71/70; B65D 73/0014; B65D 73/02; B65D 75/00; B65D 75/008; B65D 75/02; B65D 75/04; B65D 75/12; B65D 75/14; B65D 75/20; B65D 75/22; B65D 75/26; B65D 75/28; B65D 75/30; B65D 75/305; B65D 75/32; B65D 75/326; B65D 75/327; B65D 75/36; B65D 75/366; B65D 75/367; B65D 75/38; B65D 75/48; B65D 75/50; B65D 75/52; B65D 75/525; B65D 75/527; B65D 75/54; B65D 75/56; B65D 75/563; B65D 75/566; B65D 75/58; B65D 75/5805; B65D 75/5811; B65D 75/5816; B65D 75/5833; B65D 75/5838; B65D 75/585; B65D 75/5855; B65D 75/5861; B65D 75/5866; B65D 75/5872; B65D 75/5877; B65D 75/5883; B65D 75/5894; B65D 77/00; B65D 77/003; B65D 77/02; B65D 77/04; B65D 77/042; B65D 77/0433; B65D 77/0446; B65D 77/0453; B65D 77/046; B65D 77/0466; B65D 77/048; B65D 77/0486; B65D 77/0493; B65D 77/06; B65D 77/061; B65D 77/062; B65D 77/064; B65D 77/065; B65D 77/067; B65D 77/20; B65D 77/202; B65D 77/2024; B65D 77/2028; B65D 77/2032; B65D 77/2036; B65D 77/204; B65D 77/2044; B65D 77/2052; B65D 77/206; B65D 77/2064; B65D 77/2072; B65D 77/2096; B65D 77/225; B65D 77/24; B65D 77/245; B65D 77/30; B65D 77/38; B65D 79/0087; B65D 79/02; B65D 81/02; B65D 81/025; B65D 81/03; B65D 81/05; B65D 81/052; B65D 81/07; B65D 81/09; B65D 81/18; B65D 81/20; B65D 81/2015; B65D 81/2023; B65D 81/2038; B65D 81/2076; B65D 81/22; B65D 81/24; B65D 81/245; B65D 81/26; B65D 81/261; B65D 81/264; B65D 81/266; B65D 81/267; B65D 81/268; B65D 81/28; B65D 81/30; B65D 81/32; B65D 81/3205; B65D 81/3211; B65D 81/3216; B65D 81/3222; B65D 81/3227; B65D 81/3233; B65D 81/3238; B65D 81/3244; B65D 81/325; B65D 81/3255; B65D 81/3261; B65D 81/3266; B65D 81/3272; B65D 81/3283; B65D 81/3288; B65D 81/3294; B65D 81/34; B65D 81/3407; B65D 81/3415; B65D 81/343; B65D 81/3446; B65D 81/3453; B65D 81/3461; B65D 81/3484; B65D 81/36; B65D 81/361; B65D 81/365; B65D 81/368; B65D 81/38; B65D 81/3802; B65D 81/3806; B65D 81/3813; B65D 81/3816; B65D 81/3818; B65D 81/3823; B65D 81/3827; B65D 81/3837; B65D 81/3841; B65D 81/3858; B65D 81/3865; B65D 81/3869; B65D 81/3874; B65D 81/3876; B65D 81/3881; B65D 81/3886; B65D 81/3888; B65D 81/389; B65D 81/3897; B65D 83/00; B65D 83/0005; B65D 83/0011; B65D 83/0022; B65D 83/0038; B65D 83/0044; B65D 83/0055; B65D 83/0061; B65D 83/0072; B65D 83/0094; B65D 83/0454; B65D 83/0481; B65D 83/06; B65D 83/08; B65D 83/0805; B65D 83/0882; B65D 83/14; B65D 83/141; B65D 83/145; B65D 83/16; B65D 83/164; B65D 83/18; B65D 83/182; B65D 83/184; B65D 83/20; B65D 83/201; B65D 83/202; B65D 83/203; B65D 83/205; B65D 83/206; B65D 83/207; B65D 83/22; B65D 83/222; B65D 83/24; B65D 83/26; B65D 83/267; B65D 83/28; B65D 83/285; B65D 83/30; B65D 83/303; B65D 83/32; B65D 83/34; B65D 83/345; B65D 83/36; B65D 83/38; B65D 83/382; B65D 83/384; B65D 83/386; B65D 83/40; B65D 83/42; B65D 83/425; B65D 83/44; B65D 83/46; B65D 83/48; B65D 83/52; B65D 83/54; B65D 83/56; B65D 83/567; B65D 83/58; B65D 83/60; B65D 83/62; B65D 83/625; B65D 83/64; B65D 83/646; B65D 83/66; B65D 83/666; B65D 83/673; B65D 83/68; B65D 83/682; B65D 83/687; B65D 83/70; B65D 83/72; B65D 83/75; B65D 83/752; B65D 83/753; B65D 83/7532; B65D 83/7535; B65D 83/754; B65D 83/756; B65D 83/757; B65D 83/76; B65D 83/761; B65D 83/764; B65D 83/766; B65D 83/767; B65D 83/768; B65D 83/771; B65D 83/7711; B65D 83/7713; B65D 85/00; B65D 85/04; B65D 85/10; B65D 85/1045; B65D 85/10484; B65D 85/1056; B65D 85/10568; B65D 85/1081; B65D 85/18; B65D 85/20; B65D 85/30; B65D 85/32; B65D 85/34; B65D 85/36; B65D 85/38; B65D 85/48; B65D 85/50; B65D 85/505; B65D 85/52; B65D 85/544; B65D 85/60; B65D 85/62; B65D 85/671; B65D 85/672; B65D 85/68; B65D 85/70; B65D 85/72; B65D 85/76; B65D 85/78; B65D 85/80; B65D 85/804; B65D 85/8043; B65D 85/8061; B65D 85/8067; B65D 85/808; B65D 85/816; B65D 85/84; B65D 88/005; B65D 88/02; B65D 88/022; B65D 88/025; B65D 88/027; B65D 88/04; B65D 88/06; B65D 88/08; B65D 88/10; B65D 88/12; B65D 88/121; B65D 88/123; B65D 88/126; B65D 88/127; B65D 88/128; B65D 88/129; B65D 88/14; B65D 88/16; B65D 88/1625; B65D 88/1631; B65D 88/1681; B65D 88/26; B65D 88/28; B65D 88/30; B65D 88/52; B65D 88/524; B65D 88/526; B65D 88/528; B65D 88/54; B65D 88/62; B65D 88/64; B65D 88/74; B65D 88/741; B65D 88/742; B65D 88/744; B65D 88/748; B65D 88/76; B65D 88/78; B65D 9/38; B65D 90/00; B65D 90/0006; B65D 90/0013; B65D 90/0026; B65D 90/0033; B65D 90/0053; B65D 90/006; B65D 90/0066; B65D 90/0073; B65D 90/008; B65D 90/0093; B65D 90/02; B65D 90/021; B65D 90/022; B65D 90/023; B65D 90/026; B65D 90/027; B65D 90/028; B65D 90/029; B65D 90/04; B65D 90/041; B65D 90/042; B65D 90/044; B65D 90/046; B65D 90/048; B65D 90/06; B65D 90/08; B65D 90/10; B65D 90/12; B65D 90/18; B65D 90/20; B65D 90/22; B65D 90/24; B65D 90/32; B65D 90/325; B65D 90/34; B65D 90/40; B65D 90/42; B65D 90/46; B65D 90/48; B65D 90/501; B65D 90/503; B65D 90/505; B65D 90/52

USPC .......... 220/1.5, 1.6, 17.1, 17.2, 2.1 R, 2.3 R, 220/200, 201, 202, 203.01, 203.04, 220/203.05, 203.06, 203.07, 203.08, 220/203.09, 203.1, 203.12, 203.19, 220/203.25, 203.29, 211, 212, 212.5, 213, 220/214, 215, 216, 219, 220, 221, 222, 220/223, 225, 227, 229, 23.2, 23.4, 23.6, 220/23.8, 23.83, 23.86, 23.87, 23.88, 220/23.89, 23.9, 23.91, 230, 231, 233, 220/234, 235, 236, 238, 240, 241, 242, 220/247, 248, 249, 250, 251, 253, 254.1, 220/254.2, 254.3, 254.4, 254.6, 254.7, 220/254.8, 254.9, 255, 255.1, 256.1, 220/257.1, 257.2, 258.1, 258.2, 258.3, 220/258.4, 258.5, 259.1, 259.2, 259.3, 220/259.4, 259.5, 260, 263, 264, 265, 220/266, 267, 268, 269, 270, 273, 274, 220/276, 277, 278, 281, 282, 283, 284, 220/285, 286, 287, 288, 293, 296, 297, 220/298, 3.2, 3.3, 3.4, 3.5, 3.8, 300, 301, 220/303, 304, 305, 309.1, 309.2, 310.1, 220/314, 315, 316, 318, 319, 320, 321, 220/322, 323, 324, 325, 326, 327, 328, 220/345.1, 345.2, 345.3, 345.4, 345.5, 220/345.6, 350, 351, 359.1, 359.2, 359.3, 220/359.4, 359.5, 360, 361, 366.1, 367.1, 220/370, 372, 373, 374, 375, 376, 377, 220/378, 379, 380, 4.01, 4.03, 4.04, 4.07, 220/4.12, 4.13, 4.14, 4.17, 4.21, 4.22, 220/4.23, 4.24, 4.25, 4.26, 4.27, 4.28, 220/4.31, 4.33, 4.34, 475, 476, 478, 481, 220/482, 483, 485, 491, 495.01, 495.02, 220/495.03, 495.04, 495.05, 495.06,

220/495.07, 495.08, 495.09, 495.11, 500, 220/501, 502, 503, 504, 505, 506, 507, 220/509, 510, 515, 521, 522, 523, 524, 220/525, 526, 527, 528, 529, 530, 531, 220/532, 533, 543, 544, 549, 550, 553, 220/554, 555, 556, 558, 560.01, 560.02, 220/560.03, 560.04, 560.05, 560.08, 220/560.09, 560.1, 560.11, 560.12, 220/560.13, 560.15, 561, 562, 564, 565, 220/567.1, 567.2, 567.3, 568, 570, 220/570 COR, 571, 571.1, 572, 573, 220/573.1, 573.4, 574, 574.1, 574.3, 575, 220/576, 577, 578, 579, 580, 581, 582, 220/583, 585, 586, 590, 592.01, 592.03, 220/592.05, 592.07, 592.09, 592.15, 220/592.16, 592.17, 592.18, 592.2, 220/592.21, 592.25, 592.26, 592.27, 220/592.28, 6, 600, 601, 603, 604, 605, 220/606, 608, 609, 610, 612, 613, 614, 220/616, 617, 618, 619, 62, 62.1, 62.11, 220/62.12, 62.13, 62.15, 62.17, 62.18, 220/62.19, 62.2, 62.21, 62.22, 620, 622, 220/623, 624, 625, 626, 627, 628, 629, 220/630, 631, 632, 633, 634, 635, 636, 220/640, 641, 642, 643, 644, 646, 647, 220/648, 651, 652, 656, 657, 658, 659, 220/660, 661, 662, 663, 666, 668, 669, 220/670, 671, 672, 674, 675, 676, 678, 220/680, 681, 682, 684, 685, 686, 688, 220/692, 693, 694, 694.1, 695, 695 COR, 220/696, 697, 698, 699, 7, 700, 701, 702, 220/703, 707, 709, 710.5, 711, 712, 713, 220/714, 715, 717, 718, 719, 720, 721, 220/724, 727, 729, 730, 731, 733, 734, 220/735, 736, 737, 738, 739, 740, 741, 220/742, 745, 751, 752, 754, 755, 756; 220/757, 758, 759, 760, 761, 762, 763, 220/764, 765, 766, 767, 768, 769, 770, 220/771, 772, 773, 774, 775, 776, 780, 220/781, 782, 783, 784, 785, 786, 787, 220/788, 789, 790, 791, 792, 793, 794, 220/795, 796, 797, 798, 799, 8, 800, 801, 220/802, 803, 804, 806, 810, 811, 812, 220/822, 824, 825, 826, 827, 828, 831, 220/832, 833, 834, 835, 836, 837, 839, 220/840, 847, 848, 849, 86.1, 88.1, 88.3, 220/89.2, 890, 9.1, 9.2, 9.4, 900, 901, 220/902, 903, 904, 905, 906, 908, 908.1, 220/909, 914, 915, 915.1, 915.2, 916, 220/917, 918, 919, DIG. 13, DIG. 14, 220/DIG. 19, DIG. 22, DIG. 25, DIG. 27, 220/DIG. 29, DIG. 30, DIG. 33, DIG. 5, 220/DIG. 6, DIG. 8, FOR. 101, FOR. 105, 220/FOR. 110, FOR. 112, FOR. 173, 220/FOR. 203; 206/0.5, 0.6, 0.7, 0.81, 206/0.84, 1.5, 1.7, 1.8, 1.9, 107, 119, 206/139, 145, 15.2, 15.3, 150, 158, 161, 206/162, 201, 203, 204, 205, 207, 208, 206/209, 210, 213.1, 214, 216, 217, 219, 206/220, 221, 222, 223, 224, 225, 226, 206/229, 231, 232, 233, 242, 256, 257, 206/259, 261, 268, 276, 277, 3, 303, 206/308.1, 308.3, 311, 313, 315.1, 206/315.11, 315.3, 317, 320, 321, 322, 206/326, 335, 339, 349, 350, 352, 354, 206/361, 362, 362.2, 362.3, 362.4, 363, 206/365, 366, 369, 37, 370, 372, 373, 206/375, 376, 38, 385, 386, 387.1, 388, 206/389, 390, 397, 408, 409, 411, 423, 206/426, 427, 428, 430, 431, 432, 434, 206/438, 439, 440, 443, 445, 446, 447, 206/449, 45.2, 45.23, 45.28, 454, 455, 206/457, 459.1, 459.5, 460, 461, 463, 206/464, 466, 469, 470, 472, 473, 477, 206/478, 480, 484, 486, 488, 493, 494, 206/497, 499, 501, 503, 504, 505, 506, 206/507, 508, 509, 510, 511, 512, 514, 206/515, 518, 519, 520, 521, 521.1, 522, 206/523, 524.1, 524.2, 524.3, 524.4, 206/524.5, 524.6, 524.7, 524.8, 525, 526, 206/527, 528, 534, 534.1, 535, 538, 539, 206/540, 541, 542, 545, 546, 549, 550, 206/557, 558, 561, 562, 564, 568, 569, 206/570, 572, 573, 575, 579, 581, 583, 206/584, 585, 586, 587, 588, 589, 590, 206/591, 592, 593, 594, 595, 597, 599, 206/600, 63.3, 63.5, 701, 702, 709, 710, 206/719, 721, 723, 736, 747, 761, 775, 206/776, 803, 806, 807, 81, 810, 813, 206/818, 819, 820, 821, 822, 823; 224/148.4, 148.7, 191, 223, 250, 257, 224/405, 485, 662, 665, 671, 673, 677, 224/679, 681, 682, 683, 684, 904, 917.5; 248/151; 294/159, 170; 312/244; D32/29, 53.1; 15/105, 257.05, 257.06, 15/257.6, 264; 24/326, 349; 68/232, 68/238; 215/12.1, 202, 227, 228, 230, 215/254, 316, 328, 329, 341, 343, 347, 215/348, 349, 353, 357, 386, 391, 392, 215/397, 400, 44, 45, DIG. 2, DIG. 4

See application file for complete search history.

(56) References Cited

U.S. PATENT DOCUMENTS

| | | | | | |
|---|---|---|---|---|---|
| 2,674,389 | A * | 4/1954 | Baker | B44D 3/122 220/23.4 |
| 5,086,917 | A * | 2/1992 | Dziersk | B65D 21/0233 220/555 |
| 6,062,389 | A * | 5/2000 | Kent | B44D 3/12 220/555 |
| 8,887,940 | B2 * | 11/2014 | Kiceniuk, Jr. | B44D 3/127 248/339 |
| 2004/0195248 | A1 * | 10/2004 | Garcia | B44D 3/121 220/570 |
| 2006/0071010 | A1 * | 4/2006 | Byrne | B44D 3/14 220/754 |
| 2006/0219720 | A1 * | 10/2006 | Lundy | B44D 3/12 220/505 |

* cited by examiner

PAINT CONTAINER LINER

FIELD OF THE INVENTION

The present device relates to painting, such as that performed upon commercial buildings and homes. More particularly, the device herein relates to a liner for a container or can, which forms at least two operative cavities configured with slanted walls where the first and second cavities are employable with brushes and rollers for use with different color paints or paint types during the paint process or touch up procedures.

BACKGROUND OF THE INVENTION

The painting of homes and commercial buildings, and the like, conventionally, include a number of steps in order to provide for an acceptable outcome wherein all surfaces are covered adequately. Generally speaking, on a home or building being painted, the surfaces to be covered are cleaned and prepared in a fashion to receive and hold one or a plurality of paint layers thereon. Once so prepared, the surfaces are covered with the chosen color and type of paint, using spray guns, paint brushes and paint rollers.

Such painting may involve the application of multiple paint layers on the surfaces in order to achieve the desired even coverage of all such surfaces. However, even with the best of work by painters and even with multiple coats of paint being applied to all areas of a building and the walls and trim areas thereof, touch-up painting will be required.

Because many homes and buildings are painted with one color for large areas, such as walls, and a different color paint for trim work such as fascias, window frames, doors, and the like, such touch-up and fine painting work for trim areas, and the like, conventionally will require two colors and in many cases two types of paint to be applied. For example, where the walls of a house are one color and the trim thereof another, touching up missed areas or areas of thin coverage will require the painter to carry multiple paint colors when performing such in one pass, or the carrying of one type of paint on a first touch-up action and a second type or color of paint in a second touch-up action. Such can significantly increase the duration of time needed for painting a building or home, which can significantly increase costs where laborers are being paid.

The forgoing examples of painting requirements, actions, containers and utensils, and the like, are intended to be illustrative and not exclusive, and they do not imply any limitations on the invention described and claimed herein. Various other limitations of the related art are known or will become apparent to those skilled in the art upon a reading and understanding of the specification below and the accompanying drawings.

SUMMARY OF THE INVENTION

The device herein disclosed provides for a dual cavity liner which is configured for easy removable engagement within the interior cavity of a paint container. Such paint containers are available in many sizes such as one, two, or five-gallon paint containers. As an example only, Sherwin Williams Company provides product number 1608769, which is a two gallon polymeric container or bucket. Similarly configured paint containers are provided and sold by most paint manufacturers and hardware stores with conventional capacities of one, two, and five gallons and in other capacities to which the device herein can be operatively configured.

A particularly preferred configuration for the liner body herein is the formation of such from paper or a polymeric or plastic or other leak-proof material. Such is preferred because, by using paper or a polymeric material for the formation of the body, it will render the body both lightweight and strong. Such a formation of paper or plastic/polymeric material also allows the liner body to be formed of recycled paper or plastic material, which is preferred for ecological reasons.

Employing conventional injection molding or thermoforming, the liner body can also be easily configured in a shape which is positionable within the interior cavity of such conventionally available metal and plastic paint containers. So positioned, the liner body, in all modes herein, is preferably configured to form a rotational engagement with the conventional paint container, when the body of the liner is operatively positioned within the interior cavity of such conventional paint containers. Further, it is preferred the liner is formed with cavities formed in an inverted cone-like shape, where the lower end thereof is narrower than the openings to the two cavities. Such a configuration will allow the liner bodies to be stacked for storage, shipping, and sales displays and thereby save considerable space.

In a simple mode of the device herein, the rotational engagement of the top end or distal end of the sidewall of the liner body with the paint container may be achieved by forming the exterior circumference of the upper or distal edge of the liner sidewall at the point surrounding the open end of the liner body, with a liner circumference which is equal too, or just slightly smaller, than the circumference of the interior of a sidewall of the container at the distal edge of that container sidewall where it defines the open end of the paint container. This mode would have the bottom surface of the liner in a sliding contact with the bottom surface of the paint container during such rotation. However, while this mode of the device provides for the favored rotational engagement, it does leave the potential for paint getting between the distal edge of the liner sidewall and the interior of the sidewall of the container.

In a preferred mode herein, a rotational engagement of the top end or distal end of the sidewall of the body of the insert at the point at the open end of the liner body, with the container sidewall at the open end of the container into which it is inserted, is achieved by the provision of a ledge projecting from the distal edge of the sidewall of the body of the insert, at the open end thereof. This ledge may project from and encircle the entire circular opening of the insert body which provides brush-access to the first and second interior cavities of the body of the liner device herein, or it may project in multiple ledge sections in a radial pattern. Encircling the entire distal edge of the sidewall of the body of the insert is preferable. This is because an encircling ledge will contact over the entire top edge of the paint container and prevent paint from getting between the body of the liner and the interior of the paint container during use. This ledge is sized with a projection length to contact over and rotate against and atop an upper edge of the paint container sidewall defining the interior cavity of the conventional paint container.

As such, where the term "ledge projecting from the sidewall of the body of the device," is used herein it is meant either a single ledge projection from the body sidewall circumferentially encircling the entire open end of the body or a plurality of ledge sections projecting from the body sidewall which are in multiple positions around the open end of the body of the device.

Such paint containers are conventionally provided in the United States in metal, in a one gallon size, which are substantially 7.5 inches tall and 6.5 inches in diameter and in two gallon containers, which are substantially 8.3 inches in diameter and 9.5 inches tall, and five gallon containers which are substantially 12 inches in diameter and 14.5 inches tall. There are also widely available plastic containers, for example 2 gallon plastic containers, which are conventionally dimensioned with substantially a 10 inch diameter and 9.25 inch height.

However, the above noted dimensions are for example only and should not be discerned as limiting in any fashion as to the height and diameter of the liner herein. The insert device herein may be formed in variable diameters and heights which are configured for operable insertion into any metal or plastic paint container.

By operable insertion is meant that the liner is insertable through the opening to the internal cavity at the top of a conventional paint container, and the liner is sized such that a rotational engagement with the top of the paint container surrounding the opening thereof is formed with body of the liner. This rotational engagement may be formed between the distal edge of the sidewall of the body of the insert and the interior circumference of the paint container, or more preferably, by a ledge projecting from all or portions of the distal end of the liner sidewall at the open end thereof where that ledge is configured to rest upon a top edge of the container sidewall of the paint container.

Where the preferred ledge forms the rotational engagement of the top or first end of the liner device and the open end of the paint container, a bottom end of the body of the paint container liner is positioned adjacent the bottom surface of the paint container. In this fashion, the liner will rotate within the internal cavity of the paint container using the ledge for rotational support and to maintain it centered within the paint container.

To that end and preferred is the formation of a height or the vertical length L1 of a sidewall defining the length of the body of the container liner device herein which is equal to or slightly less than a container height length L2 of a sidewall of the paint container, which defines the interior cavity of the paint container used in combination with the liner device herein.

As noted, in all modes of the liner herein, in either polymeric or paper material, the preferred ledge projects around all or portions of the circumference of the body of the liner at a position surrounding the open end thereof. The ledge may be formed as a single encircling projection, or in separated increments and projects a distance from the open end of the liner, which will form a sliding engagement thereof atop the top surface of the paint container into which the liner is inserted.

The liner device herein is preferably formed to provide a first cavity on one side of the liner device and a second cavity which is opposite the first cavity. The two cavities are separated by a central wall and accessible through an open end of the body of the liner. The provision of two such interior cavities on the liner device herein allows the user to carry two different colors and/or types of paint which are being employed for fine paint work or touch up work. Such alleviates the need to touch-up with one color and then having to return to the same area of the job to touch up with a second color.

It is also preferred that at least a respective first and second interior sidewall of the liner device herein, which extend from a central member to the bottom of each respective interior cavity, are angled from a top edge thereof at the central member or middle area of the opening, toward the sidewall of the formed insert. This forms a first angled interior wall within the first interior cavity and a second angled interior wall within the second interior cavity of the device. These slanted or angled interior walls make it easier for the user to spread the paint onto rollers used for painting and to wipe and align brush bristles, when employing brushes.

As noted, it is particularly preferred that the liner herein be configured to rotate in the engagement thereof to and within a conventional paint container, such as that noted as sold by Sherwin Williams and other firms and manufacturers. The rotational ability allows the user to rotate the body of the liner device, while in an engaged position, where it is located within the container interior cavity and supported by the ledge upon the sidewall. This rotation allows the user to position the central member out of an alignment with the container handle engaged to opposing sides of the container sidewall and extending across the middle of the container opening.

This rotation allows the user to locate the first interior cavity and second interior cavity, to different alignments relative to the container handle engaged to such conventionally sold paint containers. When climbing on a ladder and holding the container handle, the ability to rotate the liner device in its engagement to the paint container allows the user to adjust the positioning of both interior cavities to make it easier to insert and use a brush or roller during painting. It allows the user to rotate the first cavity or second cavity of the liner to positions where a brush or roller are more easily inserted by a hand holding it, while the user is holding the container handle with the other hand.

This rotation also makes it easier for the user to avoid brush and hand contact with the container handle when removing a paint-coated brush or roller from the two cavities. While the liner device herein will provide utility to the user without such a rotational engagement, it has been found in experimentation that it was much easier and cleaner for ladder-positioned users to be able to rotate the two interior cavities to positions where removing the brush or roller did not contact against the handle with which they hold the container. A central member between the two cavities defines a ledge which the user may grip and more easily rotate the body of the liner, although they can grip the ledge also.

Another optional but preferable inclusion is the placement of magnetical attractive components, such as magnets, in an engagement with either or both of the central member and the two slanting interior walls of the liner device. As most rollers and paint brushes have ferrous metal components, such magnets allow the user to use two brushes or rollers, or the like, and have the one not being so used held in place by magnetic attraction.

In a mode of the device that can be employed with or without the conventionally sold paint container noted herein, a handle can be engaged to the body of the container liner device. Due to the preferred thin polymeric sidewall and interior walls forming the device, if used without a surrounding paint container, then support ribs are preferably formed at least into the curved sidewalls on opposite sides of the insert device to provide rigidity.

With respect to the above description, before explaining at least one preferred embodiment of the herein insertable paint container liner and divider in detail, it is to be understood that the invention is not limited in its application to the details of construction and to the arrangement of the components in the following description or illustrated in the drawings. The paint container liner or insert invention herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other paint container liners which are operatively insertable into conventional paint containers, to hold multiple paint colors and types, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Where used herein, if not otherwise defined, the term "substantially" means plus or minus five percent.

It is an object of the present invention to provide a removable liner having a body adapted for a rotating positioning within conventional paint containers such as a one, two, or five gallon paint container, or the like, which provides at least two separate interior cavities in which paint is positioned for use by rollers and brushes and the like.

It is another object of the invention herein to provide such a liner which, once operatively positioned in a paint container, will rotate therein to allow for positioning of the cavities holding paint to comfortably and easily accessed locations in relation to the fixed handle of the container.

It is an additional object of this invention to provide such a liner which is configured with opposing slanted sidewalls on each of two interior cavities which extend in opposite angles within each of the two cavities to allow for stacking during shipping and storage and to make it easier to employ for painting and touch up with less paint which will gather deeper at the narrow bottom.

These and other objects, features, and advantages of the present paint container liner, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some but not the only or exclusive examples of embodiments and/or features of the disclosed paint container liner herein. It is intended that the embodiments and figures disclosed herein are to be considered illustrative of the invention herein, rather than limiting in any fashion.

DETAILED DESCRIPTION OF THE INVENTION

Figure 1:
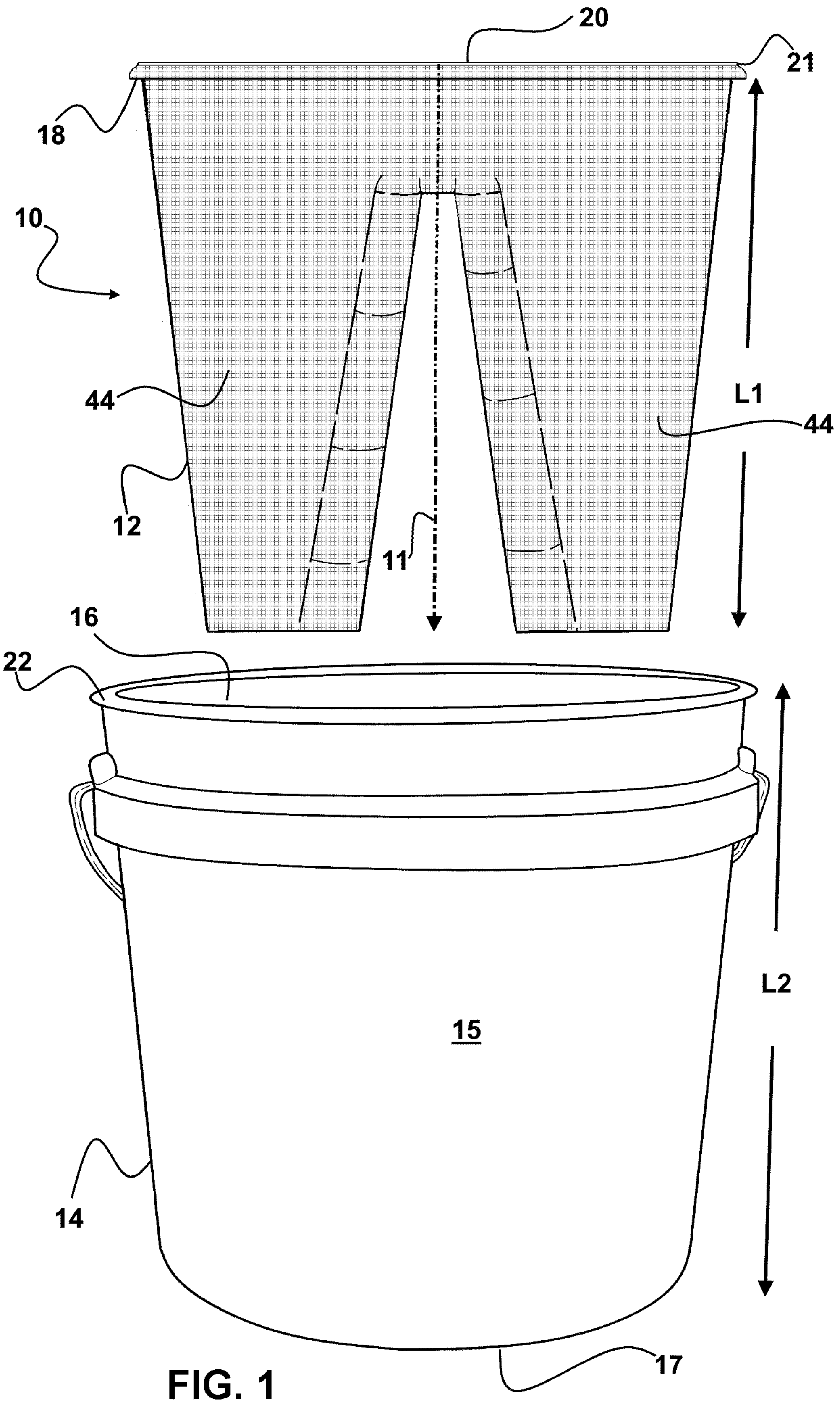
FIG. 1 depicts the container liner device herein which is inserted to a rotational engagement within the interior of a conventional paint container such as a one, two, or five gallon container.

In this description, the directional prepositions of up, upwardly, down, downwardly, front, back, top, upper, bottom, lower, left, right and other such terms refer to the device as it is oriented and appears in the drawings and are used for convenience only and such are not intended to be limiting or to imply that the device has to be used or positioned in any particular orientation.

Now referring to drawings in FIGS. 1-10, wherein similar components are identified by like reference numerals, there is seen in FIG. 1 the container liner device 10 herein. As shown, the device 10 has a container body 12 which is positionable to an operative insertion into the interior cavity 16 of a conventional paint container 14.

As noted above, a rotational engagement of a first end of the body 12 at the distal end of the body sidewall 44, where it surrounds the opening 20, and the distal end of the container sidewall 15, where it surrounds the opening to the interior cavity 16 of the container, is preferred. Such may be achieved by forming the exterior circumference of the body sidewall 44 at the distal or upper edge 21 substantially equal to, or slightly smaller than, than interior circumference of the container sidewall 15 at the upper edge 22 for which the body is configured for insertion. By equal to or slightly smaller is meant that a sliding contact would be achieved between the curving body sidewall 44 and the upper end 21 thereof and the container sidewall 15 at the upper edge 22 thereof, such that it would maintain the opening 20 of the body 12 coaxial or centered within the opening surrounded by the upper edge 22 of the container when rotated.

Where a ledge 18 is included to form this rotational engagement of the first end of the body 12 with the container sidewall 15, it is preferred that the body 12 has a length L1 having a perpendicular length from the lower surface of the ledge 18 to a bottom surface 19, which is substantially equal to or, more preferably, slightly smaller than a length L2 of the container sidewall 15 of the container 14 used in combination herewith. Making the length L1 from the ledge 18 to the bottom surface 19 (FIG. 7) slightly less than the container length L2 insures that the bottom surface 19 of the body 12 of the liner device 10 does not contact frictionally against the bottom surface 17 of the interior cavity 16 of the container 14. This is easily accomplished during configuring of the device 10 for insertion into the intended container 14 and will thereby provide for easier rotation of the body 12 with the contact of the ledge 18 with the edge 22 of the container 14. In all modes of the device 10, the body 12 is configured such that circumference of the ledge 18 configures it to be rotationally positionable atop the edge 22 of the mating container 14 into which the body 12 is configured for insertion.

Figure 2:
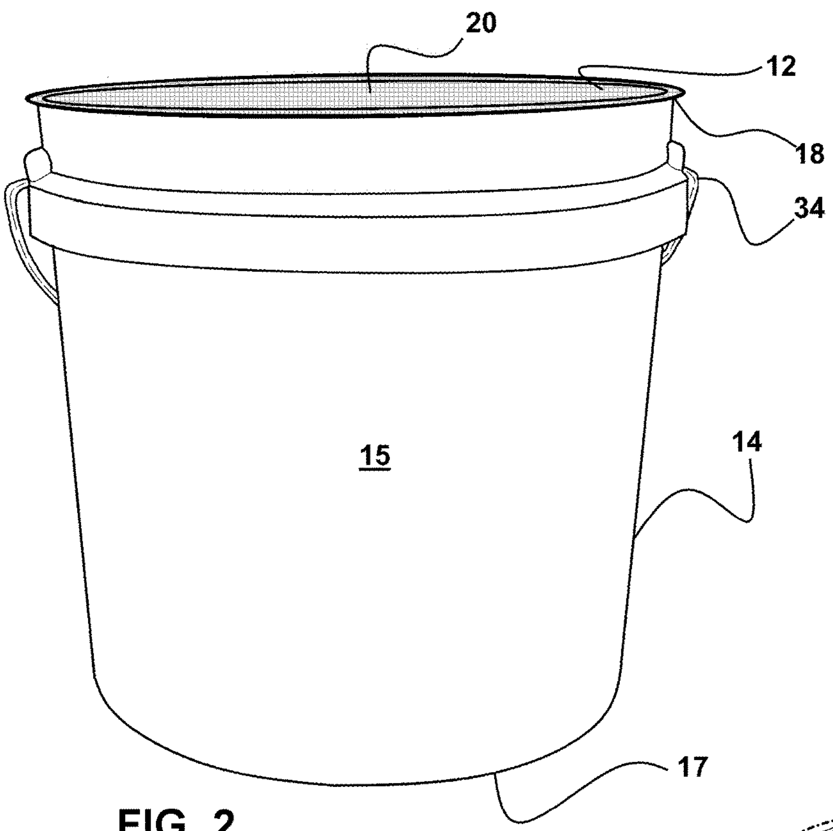
FIG. 2 depicts the liner device herein of FIG. 1 in an engaged position within a conventional paint container and having a projecting ledge slidably positioned atop a top edge of the container surrounding the open end of the paint container.

In FIG. 2 is shown the body 12 of the liner device 10 herein of FIG. 1, in an engaged position. In this engaged position, the body 12 is rotationally engaged within the interior cavity 16 of a conventional paint container 14. As shown, the rotational engagement is formed by the projecting ledge 18 of the body 12 which is slidably positioned atop and against a top edge 22 of the sidewall 15 of the conventional paint container 14 which surrounds an opening to the interior cavity 16 of the paint container 14.

Figure 3:
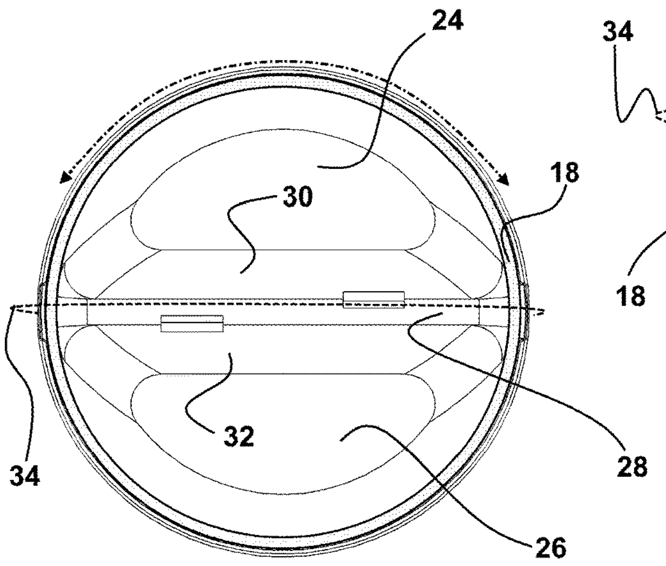
FIG. 3 depicts an overhead view of the device herein as in FIG. 2, showing the two cavities thereof, positioned on opposing sides of a central support, and showing inwardly slanting sidewalls.
Figure 4:
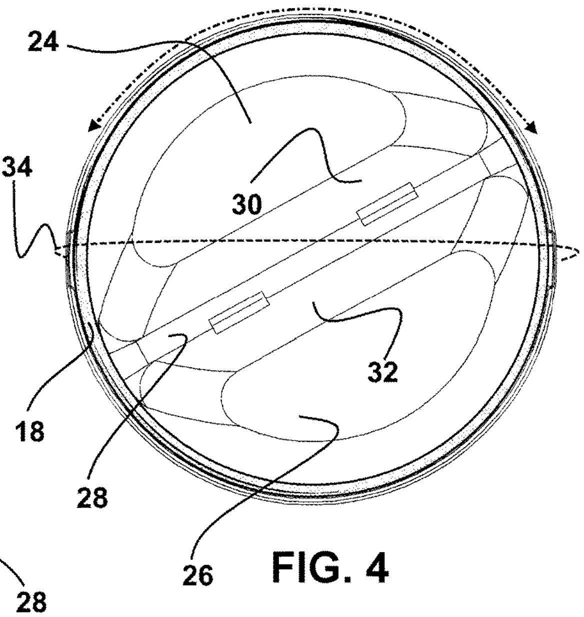
FIG. 4 depicts the liner device herein, as in FIG. 3, showing the liner rotated to position both cavities out of alignment with the handle extending across the middle of the container to allow for easier access to the cavities during use.

This rotational engagement is shown from a top view of the body 12 in an engaged position within the container 14 as in FIGS. 3 and 4. As shown in the overhead view of FIG. 3, the body 12 of the device herein is positioned to have the ledge 18 substantially aligned with the container handle 34. Also shown are the first angled sidewall 30 in the first cavity 24 and the second angled sidewall 32 within the second interior cavity 26. The first angled sidewall 30 angles outward from the central member 28 placing the bottom edge thereof where it intersects the bottom surface 19 of the body 12, closer to the sidewall 15 of the container 14 than the top edge thereof which intersects the central member 28. The second angled sidewall 32 extends in an opposite angle to that of the first angled sidewall 30.

As noted, this opposite angling of both the first angled sidewall 20 and second angled sidewall 32 as well as the inward angle of the curved sidewall 44 of the body 12 on both sides, renders the device 10 easier to use with rollers and brushes. This is because each of the first cavity and the second cavity 26 tapers from a wider first end to a respective narrower lower end. Such construction forms a lower end of the first cavity 24 and second cavity 26 which are narrower than the upper ends thereof, which causes any paint therein to be deeper than if the sidewalls and the curved sidewall 44 were perpendicular to the container sidewall 15 in which the body 12 rotationally engages.

By tapers from a wider first end to a respective narrower lower end is meant, the first cavity 24 narrows from a wider first end where the first angled sidewall 30 intersects the central member 28 to a lower end thereof where it intersects the bottom surface 19, and the second cavity 26 also narrows from a wider first end where the second angled sidewall 32 intersects with the central member 28 to a narrower lower end thereof where it intersects with the bottom surface 19. The curved sidewall 44 also angles toward the first and second sidewalls from a first end thereof at the ledge 18 to a second end thereof at the bottom surface 19.

Additionally preferred is to taper both the first cavity 24 and second cavity 26 from a wider first end to a respective lower end in an angling of the sidewall 44 of the body toward the first angled sidewall 30 of the first cavity 24 and an angling of this sidewall 44 toward the second angled sidewall 32 in the second cavity 26. This inward taper of the body sidewall 44 around the entire circumference of the body 12 is also preferred, because it was found in experimentation to not only help maintain a paint supply in a deeper reservoir thereof at the bottom of both of the tapering first cavity 24 and second cavity 26, but it also allowed for an easier rotation of the body 12 when supported by the ledge 18 upon the upper edge 22 of the sidewall 15 of the paint container 14 for which the body 12 is configured for rotational positioning. As such, it is preferred in all modes of the device 10 to angle the sidewall 44 inward toward a center axis 11 (FIG. 1) from the end of the sidewall at the opening 20 to the intersection of the sidewall 44 with the bottom surface 19 of the body 12.

The central member 28 positioned in between the first cavity 24 and second cavity 26 at a position lower than the ledge 18 is preferred in all configurations of the device 10. This is because the central member 28 can function as a ledge and defines a body handle for the user to rotate the body 12 when it has paint therein and may be too heavy to easily rotate at the ledge 18. It is preferred this central member 28 be recessed below the ledge 18. By recessed is meant locating this ledge 18 a distance of at least ½ inch below the level of the ledge 18. This was also found to make it easier to grasp when the user is holding the container 14 by the handle 34 on a ladder, as it was found during experimentation that the user had an easier angle to position their hand under the handle 34 to twist the body 12 while suspended by the ledge 18 on the edge 22 of the sidewall 15.

In FIG. 4 is shown the body 12 of the device 10 herein with the body in a rotational engagement with the conventional container 14. This allows the user to rotate the body 12 to their liking to thereby position both cavities 24 and 26 and the central member 28 out of an alignment with the container handle 34, which they may be holding during use.

As noted, this rotational positioning, which the user may choose, allows for easier access to the first and second cavities 24 and 26 during use and allows the user, who may be on a ladder or bending over on a roof, to position the body 12 to locate the first and/or second cavities 24 and 26 to optimum positions relative to the container handle 34 and to the current positioning of the hand and brush of the user at the moment. This rotational engagement also allows the user to easily reposition the two interior cavities later on when the position of the user changes or when they wish to use the paint at the bottom of the other of the first cavity 24 or second cavity 26, since different colors and types of paint are positionable therein. The provision of the central member 28 defining a handle to twist the body also aids the user.

Figure 5:
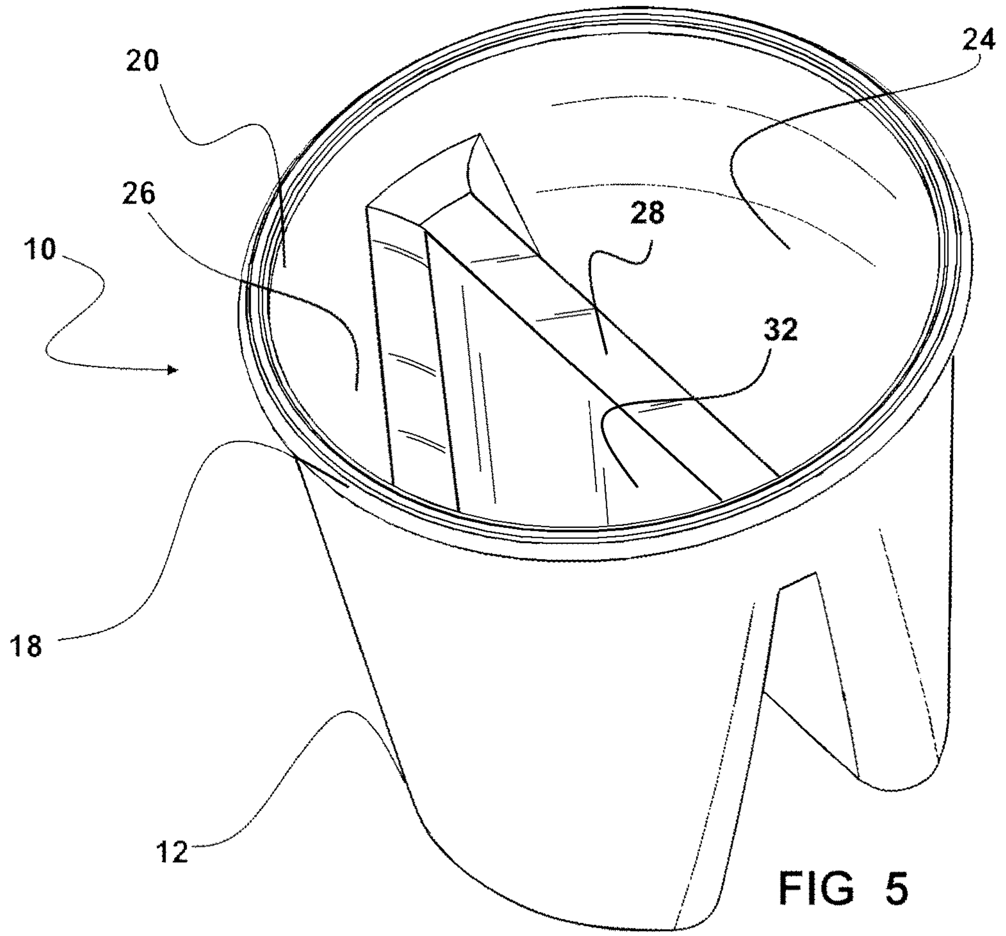
FIG. 5 shows an overhead perspective view of the liner device herein prior to operative positioning within a conventional paint container.

Shown in FIG. 5 is an overhead perspective view of the body 12 of the liner device 10 herein prior to an operative rotational positioning thereof within a conventional paint container 14 such as that of FIG. 2. As can be seen, the ledge 18 projects from the exterior surface of the body 12 a distance therefrom to a distal end which is configured to sit upon and rotate upon the upper edge 22 of the sidewall 15 of a container, such as that of FIG. 1.

Figure 6:
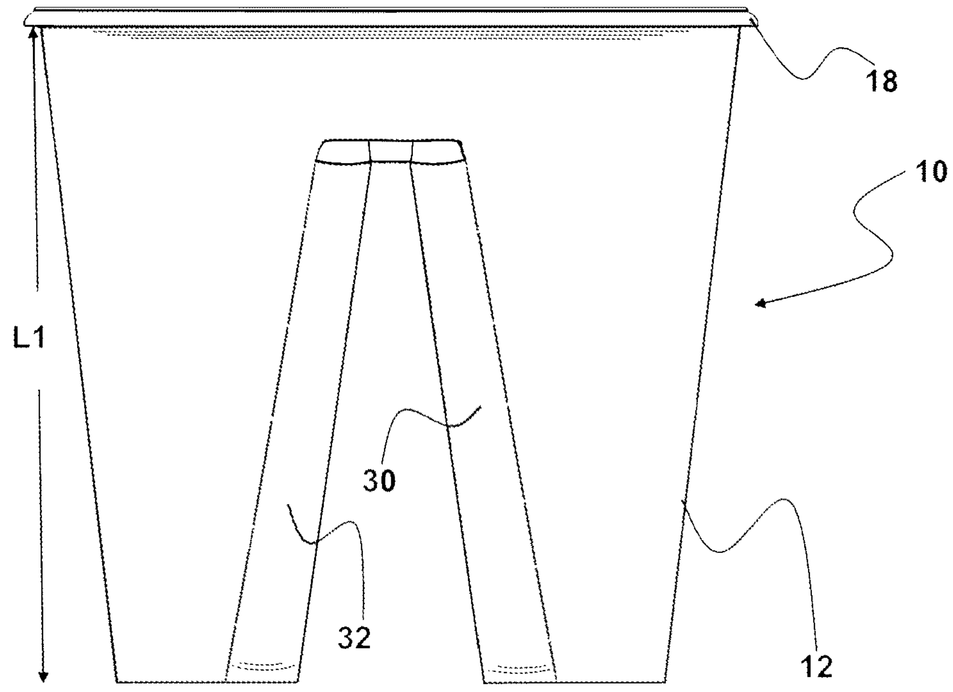
FIG. 6 shows the device herein, as in FIG. 5, from a side view thereof, showing the opposing slanting sidewalls forming the two cavities which are narrower at a bottom portion thereof to allow for stacked storage and transport, and to form first and second paint reservoirs at the bottom of each cavity which remain deeper as paint is used.

As can also be discerned from the drawings in FIGS. 4-6, in the preferred mode of the device 10, there is a narrowing of each of the first cavity 24 and second cavity 26 of the body 12 of the device 10 as they extend toward lower ends thereof. This narrowing is defined by the slanting of the sidewall 44 and the first interior sidewall 30 and the second interior sidewall 32 at angles toward each other. This configuration forms the body 12 in a manner in which it may be stacked for both shipment and point of sale.

Figure 7:
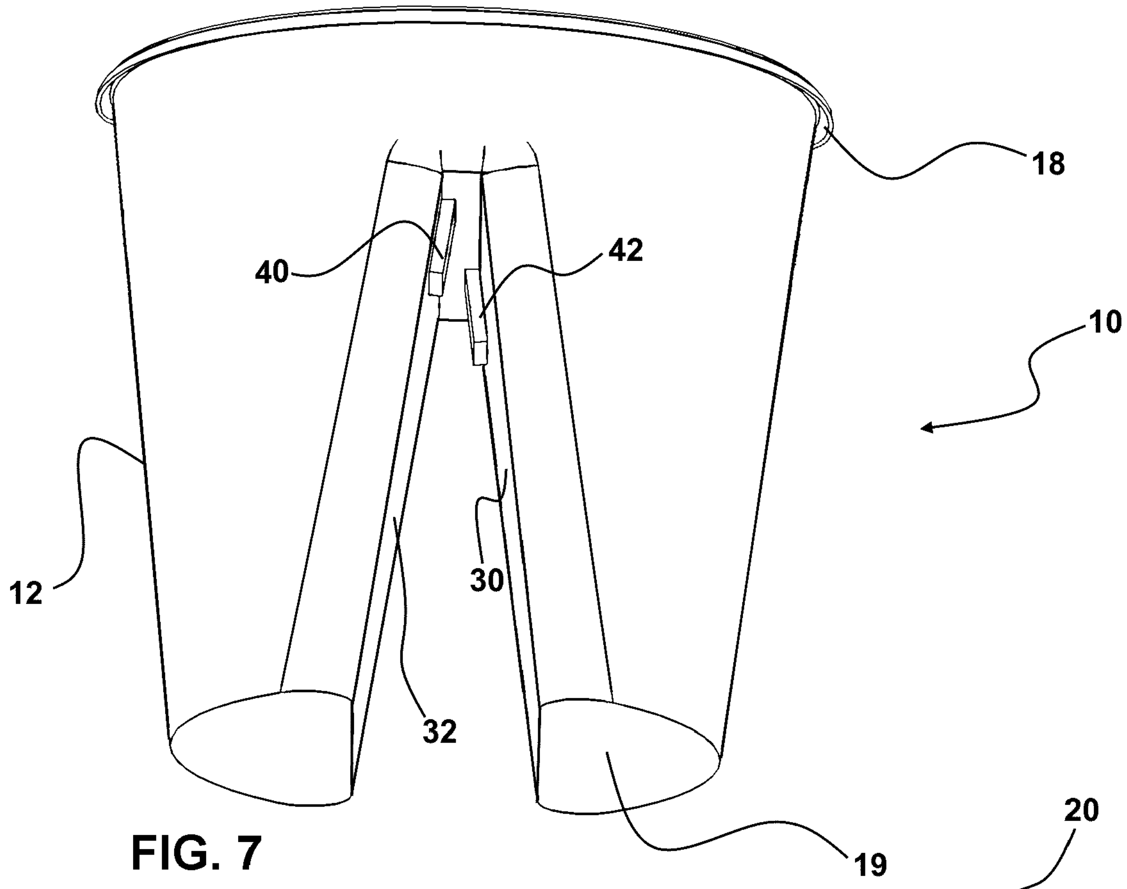
FIG. 7 shows a lower perspective view of the device, as in FIG. 6, and depicts optional magnets which may be included.
Figure 8:
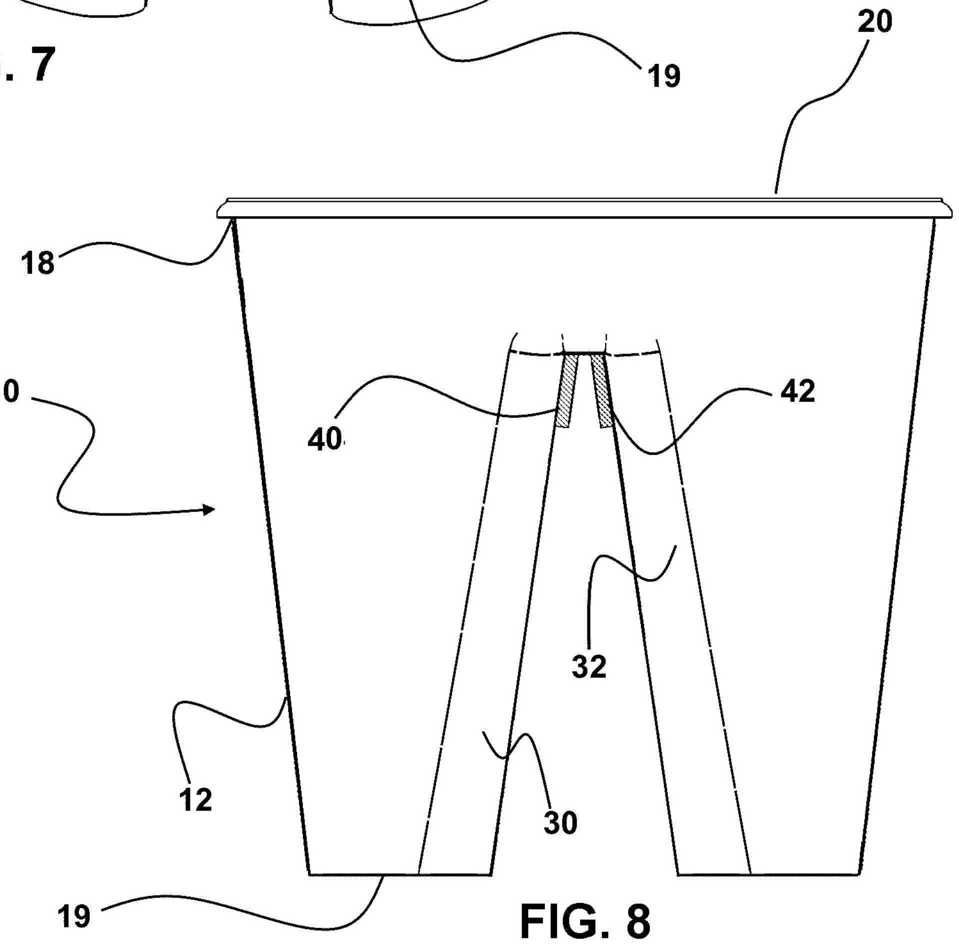
FIG. 8 shows an opposite side view from that of FIG. 6 and shows optional magnets which may be included for removable holding of paint brushes.

In FIGS. 6-8 are shown views of the device 10 herein as in FIG. 5. As can be discerned, the slanting first angled sidewall 30 and second angled sidewall 32 both angle away from each other and slant toward the body sidewall 44 of the body 12. The body sidewall 44 angles from the distal or top end thereof adjacent to and surrounding the opening 20 of the body 12 toward both the first angled sidewall 30 and second angled sidewall 32. This preferred configuration of all modes of the device 10 forms the first cavity 24 and second cavity 26 in a fashion wherein they are both narrower at a bottom portion thereof than at the top portions thereof.

Also shown in FIGS. 7-8 are optional magnetic attractive components such as a first magnet 40 and second magnet 42. As noted above, if included in operative engagements to the body 12, the magnetic attractions provided can be employed to hold brushes or rollers steady within the first cavity 24 and second cavity 26 during use of the device 10 herein. This is because conventional brushes and rollers generally employ a metal collar or support member which would be attracted to the first magnet 40 and second magnet 42, and thereby help hold them in place when not in use.

Additionally, best shown in FIGS. 6 and 8 is the reverse-angled body sidewall 44 portion of the device 10 which is positioned opposite both the first angled sidewall 30 and second angled sidewall 32. This configuration is particularly preferred in that it forms both the first cavity 24 and second cavity 26 into a respective inverted cone-like shape which is wide adjacent the opening 20 making it easier for insertion of a brush or roller.

It is this inverted cone-like shape which allows for stacking of each body 12 within a body 12 positioned there below. This stacking ability is important for compact storage, shipping, and sales of the device 10 since it allows a large plurality of bodies 12 to be stacked by insertion of the formed first cavities 24 and second cavities 26 into each other, and thus into a compact stack.

Further, the formation of both the first cavity 24 and second cavity 26 in an inverted cone-like shape, helps form the reservoir holding liquid paint within both the first and second cavity into a deeper such reservoir at the bottom end of each cavity than would occur should the body sidewall 44 not angle toward the first angled sidewall 30 and second angled sidewall 32. This allows the user to use the device 10 longer since the brush or roller will have a deeper reservoir of liquid paint for positioning therein which is maintained by the decreasing distance between the body sidewall 44 and the first angled sidewall 30 and second angled sidewall 32.

Figure 9:
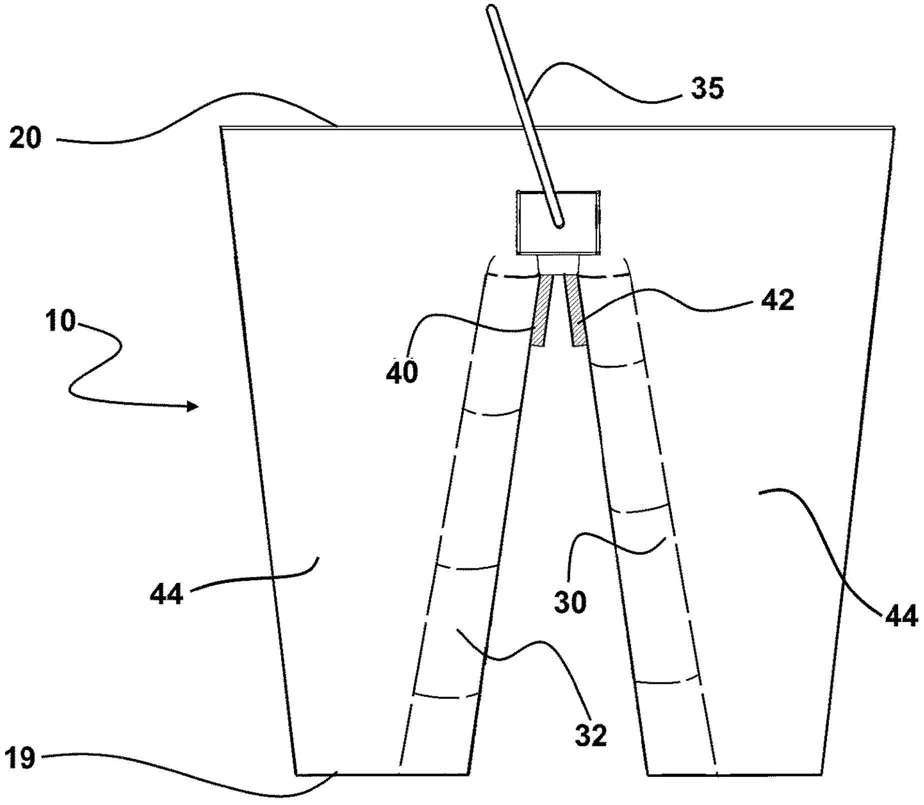
FIG. 9 depicts a side view of the liner device herein formed to be employed with or without a surrounding paint container, which includes an optional handle allow use both within and outside of a conventional paint container.
Figure 10:
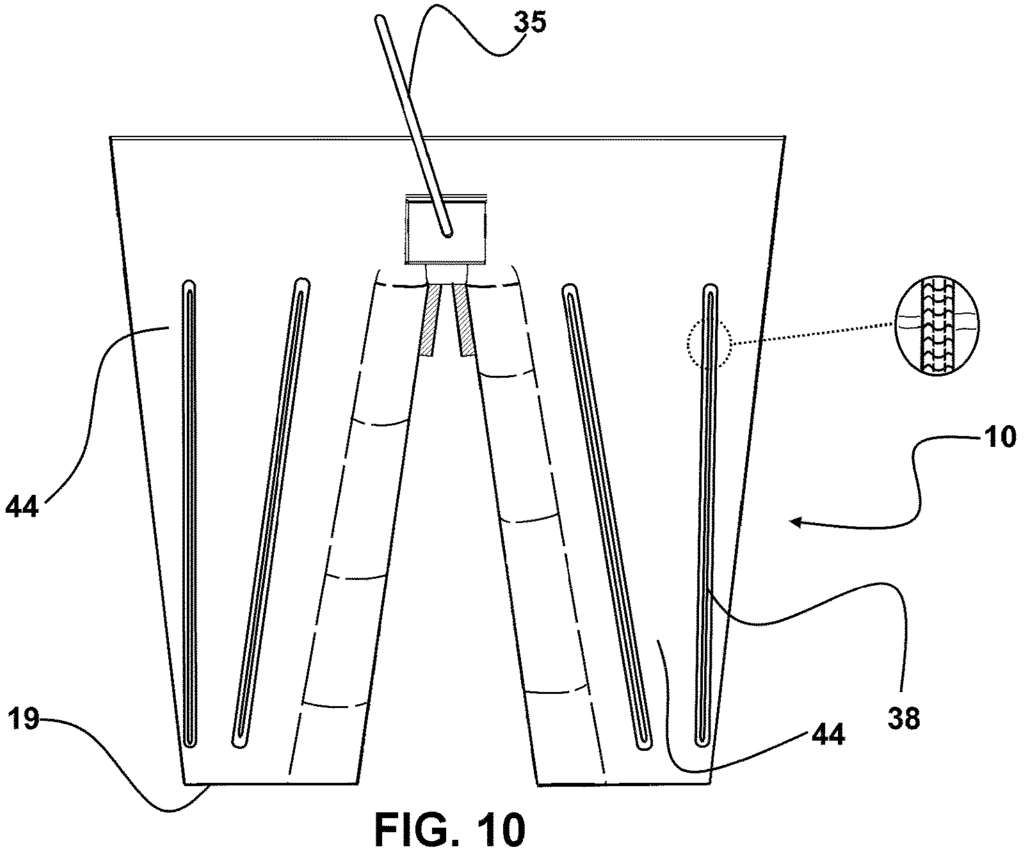
FIG. 10 depicts a side view of the device, as in FIG. 9, showing ribs formed into the sidewalls defining both of the paint-holding cavities which impart structural stiffness and structural integrity for use outside of a paint container.

In FIGS. 9-10 is shown the liner device 10 herein in configurations of the body 12 of the device 10 which allow for use thereof with or without operative engagement with a conventional paint container 14. As shown, in the side view of FIGS. 9 and 10, an optional body handle 35 is engaged to the body 12 of the device 10. This allows the body 12 of the device to be carried without engagement to a paint container 14 having a handle 34. However, with a removal of the body handle 35, the body 12 may still be positioned into an operative rotational engagement within a paint container 14. The body 12 would otherwise be configured in the fashion noted in FIGS. 1-8.

Shown in FIG. 10 is an optional configuration of the body wall 44 of the body 12 of the device 10. The body sidewall 44 of the body 12 can be reinforced for stiffness using curved ribs 38 formed into the curved body sidewall 44. Such will provide additional stiffness against bending and deformation where the device 10 is positioned outside of a container 14 with the bottom surface 19 on a support surface. However, in experimentation, the body 12 of the device 10 functioned very well to hold paint therein without the optional ribs 38 and such might be optionally included for instances there rough use might be anticipated.

It should be noted that any of the different depicted and described configurations of the disclosed paint container liner device herein can be employed with any other configuration or component shown and described as part of the device herein. Additionally, while the present invention has been described herein with reference to particular embodiments thereof and/or steps in use, a latitude of modifications, various changes and substitutions are intended in the foregoing disclosure, and it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A liner for a container comprising:

a body, said body having a curved sidewall, said curved sidewall having an upper edge extending in a circle circumferentially around an opening at an upper end of said body, said curved sidewall extending from said opening to a bottom surface of said body;

a central member extending from a first side of said curved sidewall to an opposing side of said curved sidewall;

said central member having a planar top surface thereof, said planar top surface of said central member being recessed below said upper edge and extending between a first side edge of said planar top surface and a second side edge of said planar top surface;

said body having a first cavity, said first cavity located between said curved sidewall and a first sidewall, said first sidewall extending from said first side edge of said planar top surface of said central member to said bottom surface of said body;

said body having a second cavity, said second cavity located between said curved sidewall and a second sidewall, said second sidewall extending from said second side edge of said planar top surface of said central member opposite said first side thereof, to said bottom surface of said body;

said body configured for positioning into an interior cavity of a container through a container opening of said container defined by an upper edge of a container sidewall of said container, to an engaged position therein, wherein said opening of said body is maintained coaxial and aligned with said container opening;

a ledge extending circumferentially from said curved sidewall;

said ledge forming a sliding engagement atop and against said upper edge of said container sidewall with said body in said engaged position;

a first magnet positioned on an exterior surface of said first sidewall on an opposite side thereof from an interior surface of said first sidewall located in said first cavity;

said first magnet for magnetically holding a first paintbrush upon said first sidewall adjacent said central member at said first side of said curved sidewall;

a second magnet positioned on an exterior surface of said second sidewall on an opposite side thereof from an interior surface of said second sidewall located in said second cavity;

said second magnet for magnetically holding a second paintbrush upon said second sidewall adjacent said central member at said opposing side of said curved sidewall; and said body being rotatable while positioned in said interior cavity to thereby rotate said first cavity and said second cavity to an angular position within said interior cavity of said container, whereby a user can position paint within said first cavity and said second cavity and rotate said body within said interior cavity to position said first cavity and second cavity for easier access to said paint during use.

2. The liner for a container of claim 1, additionally comprising:

said curved sidewall angling toward a center axis of said body from a wider end of said body at said opening to a narrower end of said body at said bottom surface.

3. The liner for a container of claim 2, additionally comprising:

said first sidewall of said first cavity extending at an angle toward said curved sidewall and away from said center axis thereby forming a tapered first cavity having a wider end thereof at said first side of said central member and a narrower end thereof at said bottom surface; and said second sidewall of said second cavity extending at an angle toward said curved sidewall and away from said center axis thereby forming a tapered second cavity having a wider end thereof at said second side of said central member and a narrower end thereof at said bottom surface.

4. The liner for a container of claim 1, additionally comprising:

a length of said body along said center axis from said upper edge of said curved sidewall to said bottom surface being less than a container sidewall length from said upper edge of said container sidewall to a bottom surface of said container; and a gap between said bottom surface of said body and said bottom surface of said container with said body held in said engaged position by said ledge in said sliding engagement atop and against said upper edge of said container sidewall.

5. A liner for a container comprising:

a body, said body having a curved sidewall, said curved sidewall having an upper edge extending in a circle circumferentially around a circular opening at an upper end of said body, said curved sidewall extending from said circular opening to a bottom surface of said body;

a central member extending from a first side of said curved sidewall to an opposing side of said curved sidewall said central member being recessed below said upper edge;

said body having a first cavity, said first cavity located between said curved sidewall and a first sidewall, said first sidewall extending from a first side of said central member to said bottom surface of said body;

said body having a second cavity, said second cavity located between said curved sidewall and a second sidewall, said second sidewall extending from a second side of said central member opposite said first side thereof, to said bottom surface of said body;

a planar top surface of said central member extending between said first side of said central member and said second side of said central member;

said body positionable into an interior cavity of a circular container through a circular container opening of said container defined by an upper edge of a container sidewall of said container, to an engaged position therein, wherein said opening of said body is maintained coaxial and aligned with said circular container opening;

said body configured with a length along said center axis from said upper edge of said curved sidewall to said bottom surface being less than a container sidewall length from said upper edge of said container sidewall to a bottom surface of said container;

curved ribs formed into the curved sidewall of the body;

said curved ribs defining stiffeners resisting bending and deformation of the sidewall; and whereby a gap is formed between said bottom surface of said body and said bottom surface of said container with said body held in said engaged position by said ledge in said sliding engagement atop and against said upper edge of said container sidewall.

6. A liner for a container comprising:

a body, said body having a curved sidewall, said curved sidewall having an upper edge extending in a circle circumferentially around an opening at an upper end of said body, said curved sidewall extending from said opening to a bottom surface of said body;

curved ribs formed into the curved sidewall of the body; and said curved ribs defining stiffeners resisting bending and deformation of the curved sidewall;

a central member extending from a first side of said curved sidewall to an opposing side of said curved sidewall;

said central member having a planar top surface thereof, said planar top surface of said central member being recessed below said upper edge and extending between a first side edge of said planar top surface and a second side edge of said planar top surface;

said body having a first cavity, said first cavity located between said curved sidewall and a first sidewall, said first sidewall extending from said first side edge of said planar top surface of said central member to said bottom surface of said body;

said body having a second cavity, said second cavity located between said curved sidewall and a second sidewall, said second sidewall extending from said second side edge of said planar top surface of said central member opposite said first side thereof, to said bottom surface of said body;

said body configured for positioning into an interior cavity of a container through a container opening of said container defined by an upper edge of a container sidewall of said container, to an engaged position therein, wherein said opening of said body is maintained coaxial and aligned with said container opening; and said body being rotatable while positioned in said interior cavity to thereby rotate said first cavity and said second cavity to an angular position within said interior cavity of said container, whereby a user can position paint within said first cavity and said second cavity and rotate said body within said interior cavity to position said first cavity and second cavity for easier access to said paint during use.

* * * * *